United States Patent [19]
Schwartz et al.

[11] Patent Number: 5,481,619
[45] Date of Patent: Jan. 2, 1996

[54] INSPECTION METHOD USING TEMPLATES IMAGES, UNIQUE HISTOGRAM ANALYSIS, AND MULTIPLE GRAY LEVELS CORRELATED TO ADDRESSES OF TEMPLATE IMAGES

[76] Inventors: Nira Schwartz; Arie Shahar; Richard Woods, all of 2800 Plaza Del Amo #187, Torrance, Calif. 90503

[21] Appl. No.: 910,721

[22] Filed: Jul. 7, 1992

[51] Int. Cl.$^6$ .................................................. G06K 9/00
[52] U.S. Cl. ............................. 382/141; 382/217; 348/92
[58] Field of Search .................................. 382/8, 18, 30; 358/101, 106, 107; 348/86, 92, 94; 209/939, 522

[56] References Cited

U.S. PATENT DOCUMENTS

| | | | |
|---|---|---|---|
| 4,429,414 | 1/1984 | Asakawa | 382/30 |
| 4,637,054 | 1/1987 | Hashim | 382/8 |
| 5,007,096 | 4/1991 | Yoshida | 382/8 |
| 5,052,044 | 9/1991 | Gaborski | 382/30 |
| 5,136,661 | 8/1992 | Kobayashi | 382/30 |
| 5,204,911 | 4/1993 | Schwartz et al. | 382/30 |

Primary Examiner—Yon J. Couso
Attorney, Agent, or Firm—David Pressman

[57] ABSTRACT

A technique for detecting defects in stationary products or in products moving on a production line (102, FIG. 1) by analyzing their images uses a matrix or line-scan camera (104, FIG. 1) for taking images of products (102). The product's dimensions are measured with accuracy and the sizes and positions of their surface defects are determined. The technique is much faster and more accurate than current techniques and is based on an analysis of the histogram vectors of the full image (FIG. 5). A carefully selected template image (A1, FIG. 2) composed of templates (B1, FIG. 2) is created and saved in the memory of a computer (106, FIG. 1). The method also includes the steps of creating and saving a histogram vector of the template image loading Look-Up Tables with a shifting and quantizing function for the image gray levels saving a product image in memory to be superposed onto template image (FIG. 1) creating and saving a histogram vector of the result unit superposed image and analyzing the resulting histograms, i.e., finding discontinuations, changes the values of gray levels, appearance of new gray levels, etc. This results in the detection of product dimensions or surface defects and further allows deciphering of product codes.

18 Claims, 5 Drawing Sheets

FIG 1 - PRIOR ART

INSPECTION METHOD USING TEMPLATES IMAGES, UNIQUE HISTOGRAM ANALYSIS, AND MULTIPLE GRAY LEVELS CORRELATED TO ADDRESSES OF TEMPLATE IMAGES

CROSS-REFERENCE TO RELATED APPLICATION

The present patent application is related to our application, Ser. No. 07/706,800, Filed 1991 May 25, now U.S. Pat. No. 5,204,911, Granted 1993 Apr. 20.

BACKGROUND

1. Field of the Invention

Generally, the field of the invention relates to the field of quality control. Products inspected and measured by an optical scanner while moving on a production line and they are accepted for use or rejected based on the inspection results.

2. Prior Art

Image processing systems used a great deal in today's product quality control systems. They are replacing human manpower since they have the advantages of higher throughput, better accuracy of inspection, and lower cost An inspection system contains a light source with a unique wavelength that illuminates the product being inspected. Images of the inspected products are stored in a computer's memory for analysis by means of an algorithm, also stored in the computer's memory.

Lately, the structure of many inspected products has become more complicated and harder to inspect. For example today's printed circuit boards (PCBs) contain more printed lines per inch than a year ago. Wafer sorting and inspection has became much more complicated Therefore there is a need for inspection systems with faster throughput and better accuracy.

Today automated inspection machines analyze images of complicated structures, such as printed circuit boards, wafers, and wires by means of video cameras and computers. The images taken by the video camera are stored in the memory of a computer. Several standards for image acquisition exist, depending on the type of the camera used. RS170, the US standard, uses an image of 491 lines by 649 pixels. The acquisition rate is 30 images per second. There are non-standard cameras with higher rate of image acquisition, or line cameras that use line sensors with a variety of pixel counts.

Complicated products, such as PCBs, need a line-by-line algorithmic image analysis. Detecting defects and bad solder joints in the size range of one pixel, demand analysis of the gray level values of each pixel. This is necessary to assure good performance of the PCB.

Today, line-by-line image analysis algorithms, such as filtering, averaging, edge enhancement techniques, and neighborhood comparison, require a lot of processing time, resulting in low throughput.

Still another method of inspecting images (based on our above patent) uses templates and histograms of a full image. The technique has the advantage of a quick and accurate results as long as the products' structure is not highly complex.

Products with highly complicated structures require highly complicated templates. In the most complicated templates, each of the pixels in the template has a unique gray level value. A template size of 512 horizontal (H)×512 vertical (V)(= 262,144 total pixels) requires that amount of gray level values. The histogram vector is an array of data, of length 262, 144 places, where each data place is represented by 18 bits (the gray level of each pixel). This is stored as 589,824 bytes of data in memory (byte=eight binary bits).

The histogram vector is thus very large. The processing time for histogram analysis is thus also large, reducing the advantage of high-speed processing.

OBJECTS AND ADVANTAGES

Accordingly, it is an object of the invention to provide an improved method for inspecting, measuring, and sorting highly complex structured products to find defects that may be present in such products, while they are moving on a production line.

Other objects are to locate individual defects in the products and to determine whether they are within a desired accuracy range, to locate the positions of the defects on a full image of the product using pixels as basic elements, to evaluate defects quantitatively, i.e., to determine the number of pixels associated with defects in a full image of product, to determine defects of the products in terms of their dimensional accuracy, to provide quality control of such products as PCBs or medicine ampoules, the threaded neck(s) of screws, to accelerate inspection results, to carry out quality control of products, and to perform the foregoing on a real-time basis with the use of computer techniques. Still further objects and features of the invention will be apparent after consideration of an ensuring description and accompanying drawings.

SUMMARY

These objects and advantages are attained by optically scanning an object to be inspected, creating a plurality of templates images and saving these in memory in the format of an image and/or part of an image, generating a unique histogram vector of each of the templates images and saving these in memory, creating an image of a product, creating a modified product image by modifying the gray levels of the product image, saving the results in memory, superposing the modified image and the plurality of templates images, creating histogram vectors of the result of the superposition and saving these in memory, and analyzing the histogram vectors to detect defects, estimate defect physical sizes, evaluate product dimensions, and detect code marks.

Figure 1:
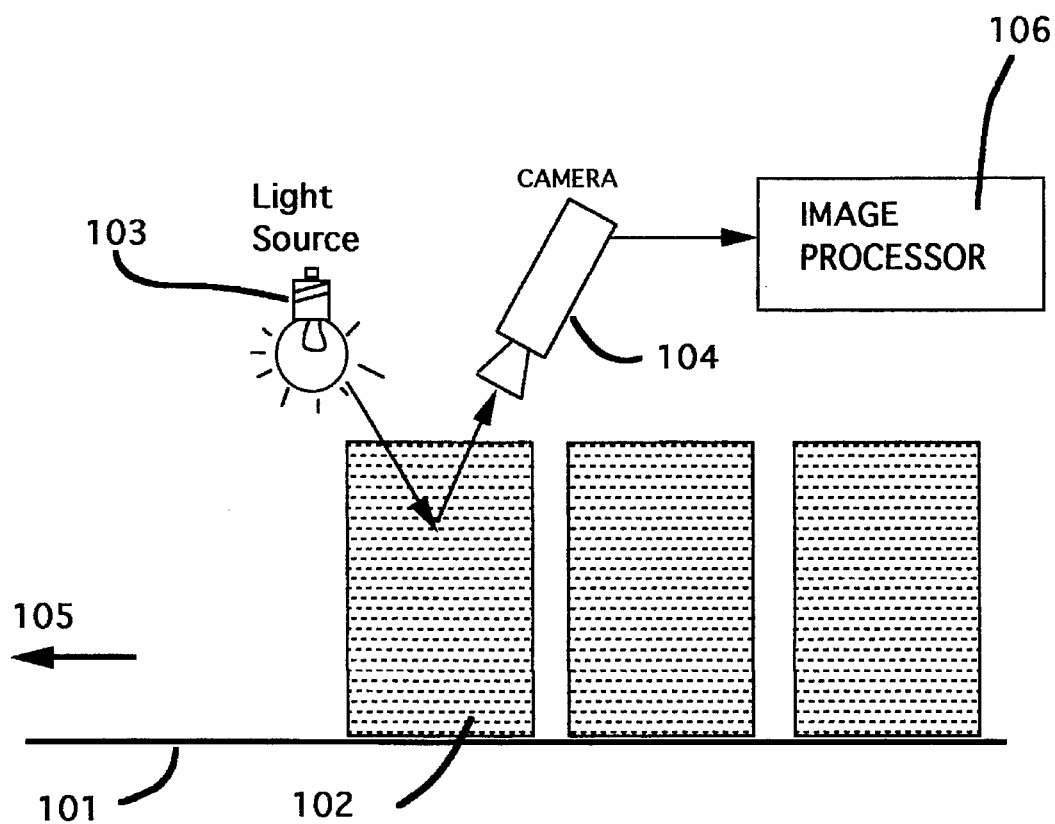
FIG. 1 is a schematic view of a prior-art quality-control system employing an image processor according to the invention

| | |
|---|---|
| 101 Conveyor | 102 Printed circuit board |
| 103 light source | 104 Camera |
| 105 Direction of motion | 106 Image processor |
| 501 Light sensor | 502 Frame grabber |
| 503 LUT | 504 16 bit ALU |
| 505 Histogram function | 506 Template storage memory |
| 507 Synchronization and pulse detector | 508 Counter and reset |
| X, Y Coordinates | A1 Template Image |
| B1 Line Template | G Histogram amplitude line |
| A, B, C Printed wires | D Printed circuit board image |
| F Superposed image | |

BASIC TERMINOLOGY

Prior to discussing the present method, the following definitions are presented to aid in understanding same.

Histogram vector: A histogram of an image is a histogram vector having a length equal to the number of gray levels in an image. The data stored in each vector location is the number of pixels for that particular gray level in the image. For example, the value stored in location 78 of the histogram vector will indicate the number of pixels in the image that has a gray level value of 78.

Image format: This indicates image size. The image format standard the US is RS170, which means that an image is composed of 491 lines by 649 pixels. The image acquisition rate is 30 images per second.

Pixel: The smallest element of an image to be individually processed in a video display system. Therefore a pixel is the smallest division in any accuracy measurement.

Gray level: The full intensity that the camera is able to represent divided into 128 levels. Each pixel has an intensity that is a portion of the maximum intensity and is represented by a corresponding gray level.

Pixel clock: A rate used to transfer data between system units.

LUT: Look-up table, uses the digital data value of a pixel as an input or index into the table. Each input value has a corresponding output value. The output values determined at the time the LUT is defined; all index values can map to a single value; groups of index values can also map to a single value. The choice is determined by the function which the user intends the LUT to serve.

GENERAL DESCRIPTION OF THE METHOD

The method of the invention comprises the following sequential steps:

(1) An object to be inspected is scanned optically.
(2) A plurality of templates images are created and saved in memory in the format of an image and/or pan of an image.
(3) A unique histogram vector of each of the templates images is generated and saved in memory.
(4) An image of a product is crated.
(5) A modified product image is created by modifying the gray levels of the product image.
(6) The results are saved in memory.
(7) The modified image and the plurality of templates images are superposed.
(8) Histogram vectors of the result of the superposition are created and saved in memory.
(9) The histogram vectors is analyzed to:
  (a) detect defects,
  (b) estimate defect physical sizes,
  (c) evaluate product dimensions, and
  (d) detect code marks Each of the above steps will now be considered separately in detail.

FIG. 1—Product Inspection System—Prior Art

FIG. 1 is a general schematic configuration of an entire system for carrying out the inspection and analysis method of the invention. Assume that PCBs are to be inspected, such as board 102. The boards move on a conveyer 101 in a direction 105. The boards are illuminated by a light source 103, and their images are taken by a sensor 104, which is an industrial camera. The images are saved in memory, which is a part of image processor 106, such as one produced by Imaging Technology Inc., Woburn, Mass., Model 150/151.

Image processor 106 is composed of several memory boards (not shown). Each board is large enough to save several images. The stored images include template image, product image, and the result of the superposition process, i.e., the superposed images.

A product image is an image of a product taken by an optical sensor. A template image is a computer-generated artificial image with a plurality of preselected gray levels.

Processor 106 also includes hardware lookup tables (not shown). Those tables also used for modifying the image gray levels according to a pre-loaded conversion table at the startup cycle of the processor or the algorithm. An example of a modifying table is: (1,11), (2,12), (3,13). This means all the original gray levels in the table with values 1, 2, and 3 are shifted up by a value of 10. An example for a quantizing table is: (4,60), (5,60), (6,60). This means a set of original gray levels 4, 5, and 6 is converted to the value 60.

Processor 106 also contains a hardware board (not shown) which includes a microprocessor for calculating the histograms of images while they are saved in the memory. The motherboard of the processor unit includes a very fast computer, such as a Motorola 68040 microprocessor and an onboard RAM. This board includes an algorithm for processing the histogram vector values and making inspection decisions. Hardware systems like these exist on the market today. They are manufactured by Imaging Technology Inc., supra.

On system power up, the system in accordance with the invention operates as follows: The algorithm stored in the processing unit creates plurality of templates that are saved in the memory. The histograms of the templates are also evaluated and saved in memory. Then the lookup tables are loaded with the modified values. At that stage the image processing unit is endlessly looping, while waiting to obtain a product image from camera 104. An image is sent to processor 106 when product 102 crosses light source 103. The lookup tables shift the gray levels of the product image before saving in memory takes place. Processor 106 superposes the product and template images. The histogram hardware board then evaluates the histograms of the results and saves them in memory as a vectors. Finally the algorithm analyzes the histogram vectors to decide dimensions, defect locations, and code values.

Prior-art systems operate with less flexibility than the current system, since they deal with only one template image instead of plurality of template images and with a full-image histogram. This lower flexibility makes it very difficult to process large histogram vectors which occur with products having highly complicated structures.

Figure 2:
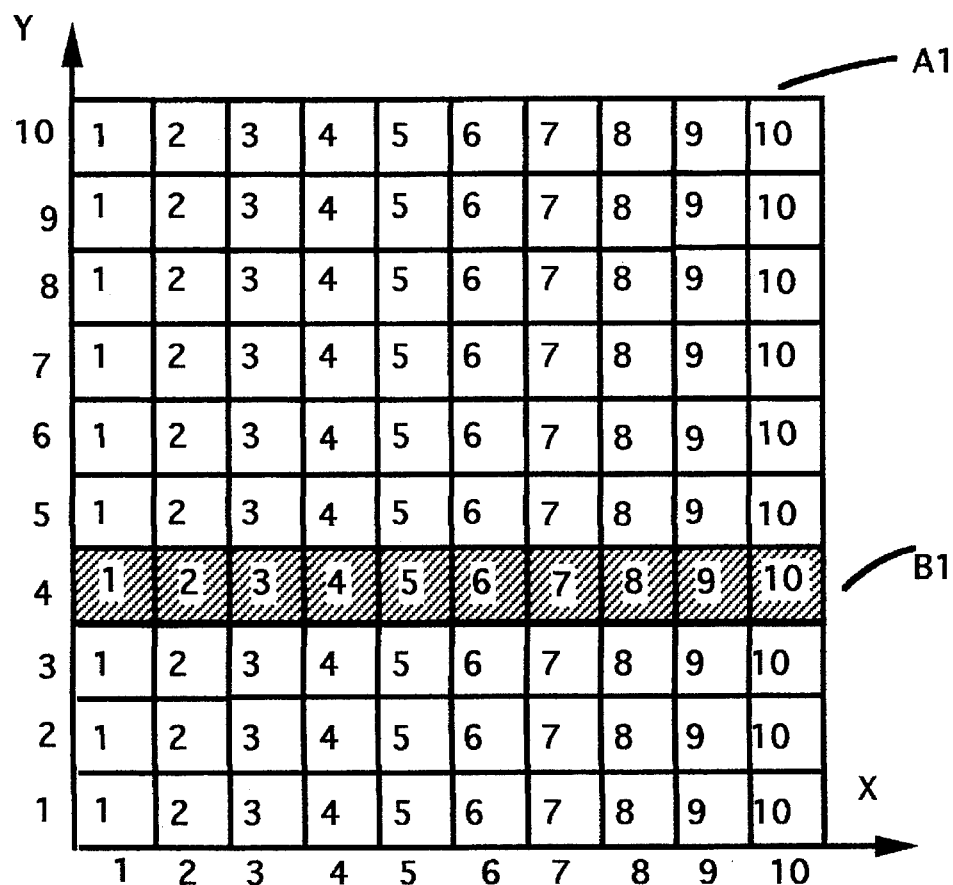
FIG. 2 is a diagram illustrating a plurality of templates images related to an inspection machine according to the invention.

FIG. 2—Creation of Template Images

FIG. 2 demonstrates the first step of the method of the invention, i.e., the creation of a plurality of template images. Full image A1 (FIG. 2) is created by assembling a plurality of individual templates images, such as ten linetemplate images. One such image is indicated at Y=4 or B1 (shaded in gray). Ten template images, like line-template B1, define the full template image A1. In accordance with the invention, we provide and save in memory a plurality of computer-generated artificial template images with a plurality of pre-selected gray levels that together define a template image;

The template images are designed to highlight the features in the product of interest and make it possible to come up with the features that are analyzed by the histogram vectors, e.g., the product's dimensions and the sizes of its defects. The sizes and their locations are typical features for analysis. Usually it takes the computer a great deal of time to create the template images. Like a real image, or part of a real image stored in the memory, it will have memory addresses related to pixels where gray levels values are stored. The template image pixel's gray level values are selected and used in a real-time inspection processes. The gray levels of the template image pixels do not necessarily resemble the gray levels of the product image.

The template image is designed to influence the values of the histogram vectors in such a way that dimensions of the product, or the defects of the products, are easily determined by analyzing the histogram vectors, as will be explained by an later example.

The template images together create a full template image with 10 pixels on the abscissa (X) by 10 pixels on the ordinate (Y), i.e., 100 pixels total.

The templates images have gray levels chosen to cover a range from 1 to 10. In the illustrated example, no two pixels in a template line have the same gray level. The gray levels can cover a range from 2 to 11, or from or 301 to 310. For the sake of simplicity, we recommend continuous numbers from the lower gray level value of 1 to the highest gray level value of 10.

Each template image can be the size of a fine in an image format. Using the RS170 format, the template image will be 649 pixels or less. Template images can be a column or more, or combinations of parts of a column and rows.

Figure 3:
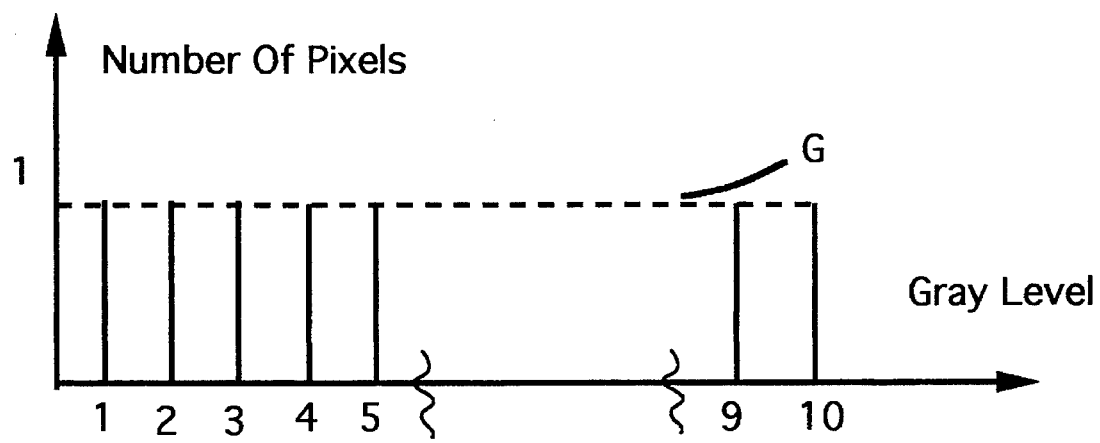
FIG. 3 is a histogram of a template image of FIG. 2.

FIG. 3—Creation of Templates Histograms

The histogram diagram of FIG. 3 is a plot of a histogram vector of a template image, or line-template image B1 shown in FIG. 2. The system will perform, not a full template image histogram, but a histogram of a portion of the full template image, i.e., the portion that relates to template image B. In the current example the system will perform one histogram per line. The histogram vector is stored in a compressed format. In our example there will be ten identical histogram vectors, one for each fine template. (at Y= 1 to 10)

Therefore the histogram vector of FIG. 3 will contain the following coordinates: (0,0), (1,1), (2,1), (3,1), . . . , and (10,1). The graph of the histogram will be a line G parallel to the abscissa, i.e., along the abscissa (X) from 0 to 10, while the ordinate (Y) will correspond to 1. These numbers indicate that there is one unique gray level for each pixel as long as we are on a fine, i.e., within the borders of one template image.

That means the histogram vector can be created and saved in memory in a compressed form. Each gray level in the histogram vector is represented by the value 1 or 0. This data can be written by a single bit instead of a byte. One byte will include the data of eight locations in the histogram vector. Current technology uses eight bytes or more to store the equivalent data in memory.

Other examples can be created (not shown) by a combination of few fines and/or combinations of portions of lines.

Figure 4:
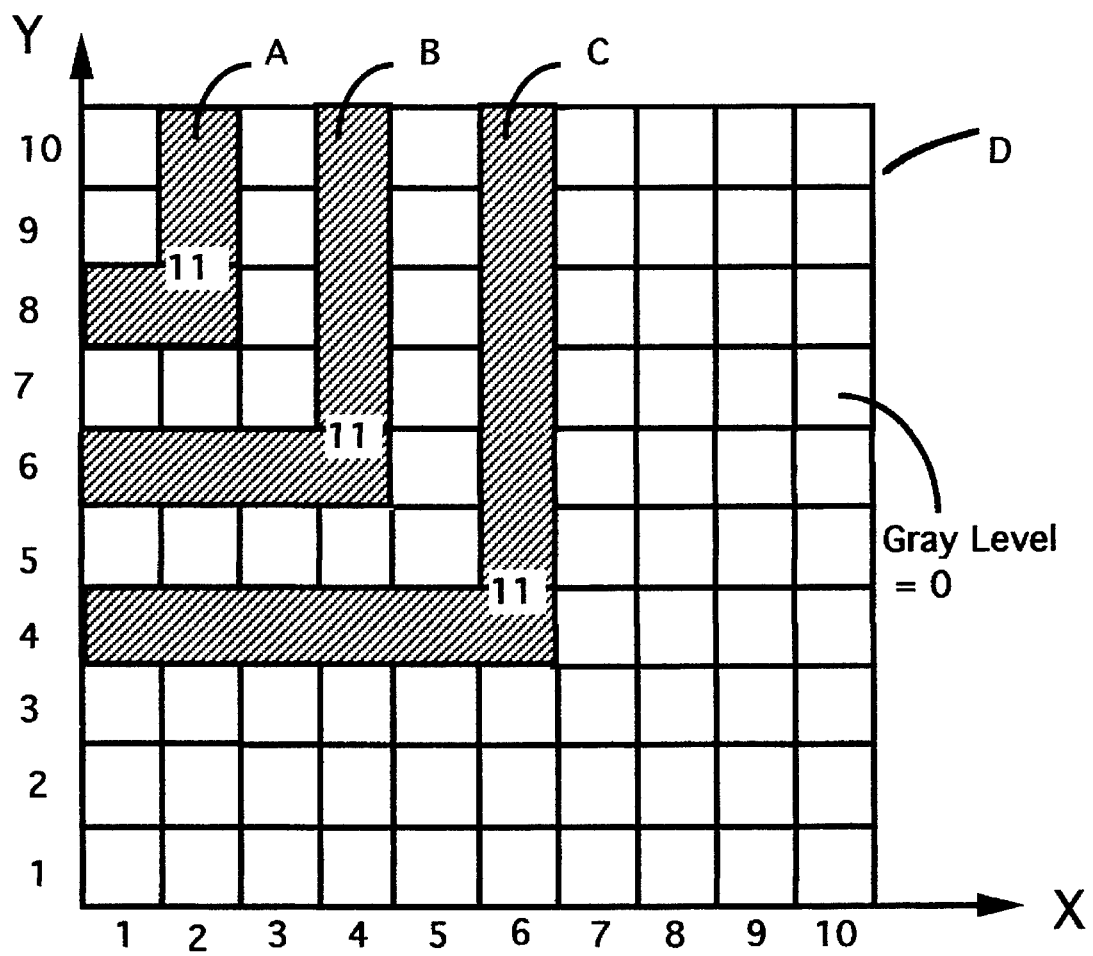
FIG. 4 is a pixel-based representation of a modified image of a product related to the invention.

FIG. 4—Image Of Product

The next step is to obtain an image of the product to be inspected. This a realtime temporary image is taken by a camera and stored in memory. Each memory location is accessed by a fast computer to analyze the image storm in the memory. FIG. 4 shows an image representing a PCB. The process of product image acquisition is repeatable for each product on the production line. Each new product image taken by the camera overwrites the previous image in the memory.

In most cases the product is inspected while moving on a production line, so that its image must be taken when it is in motion.

As stated before, the image has ten pixels on abscissa X and ten pixels on ordinate Y. Also for the sake of simplicity, the image shown is a PCB D that contains three printed wires, A, B, and C.

Each pixel is referred to by a set of coordinate values (X, Y, Z), where X is the abscissa, Y is the ordinate, and Z is a gray level. The full intensity of a standard black and white camera is divided into 128 levels. Each pixel has an intensity that is a portion of the maximum intensity and is represented by a corresponding gray level.

The gray levels of the real time image of the product (not shown) are modified by LUT (Look Up Tables). Those tables are also used for shifting and/or quantizing the image gray levels according to pre-loaded conversion tables at the startup cycle of the processor or the algorithm. In our example the LUT modifies the gray levels of the PC board lines to a gray level value of 11 (FIG. 4) and a background of gray level 0.

It is not by coincidence that the gray levels in FIG. 4 were selected to be Z= 11. Naturally the gray levels of the product vary throughout a full gray-level range, e.g., in our example, from 0 to 127. According to the invention, however, the gray levels of the product shown in FIG. 4 are modified upward relative to the background. Thus the gray levels of the PC board wires A, B, and C on the product image are all "11", i.e., Z=11.

That is, the gray levels are larger or equal to the highest gray level value (10) in the template image (FIG. 2) minus the lowest gray level value (1) in the template image (FIG. 2) plus one (10−1+ 1= 10). The value Z=10 (FIG. 4) is also a possibility. Also the color of the background is a plain color and is expressed by one gray level, in the case illustrated by gray level Z=0.

In another example (not shown) template images have gray level values from 2 to 11. In that case the gray-level values of lines A, B, and C in FIG. 4 are 10=11−2+ 1. That is the gray levels are larger or equal to the highest gray level value in the template image, minus the lowest gray level value in the template image plus one. The color of the background is plain with Z=O.

Another possibility for the background color is Z= 20.

In still another example all the values are reversed. The gray level values of the image are in the lower range and the template images have gray levels values in the high range. There are many ways to select gray-level values for template images. This can be done to modify the gray-level values of the product image, to highlight the features in the image product of interest and make it possible to come up with the features easily analyzed by histogram vectors.

MODIFYING PRODUCT IMAGE

The gray levels are then modified to highlight features (such as dimensions) in the superimposed images. The new or superposed gray levels, created as a result of the superposition, should not be equal to gray levels of the modified image or to gray levels of the template image.

The modified gray level selection is carefully designed to influence the values of the histogram vectors in such a way that dimensions of the product, or the defects of the products, are easily determined by analyzing the histogram vectors, as will be explained by the next example.

Modification of the gray level values of the product image is easily done in real time using existing hardware, namely the look-up tables. These tables automatically convert each gray level to another value, or back to itself. Usually the tables are loaded with data during startup of the computer. The data defines the conversion function and may change in real time. For reference see the operating manual, "Look-Up Tables", Technical Publications Department, 1990, Image Technology, Inc. Woburn, Mass. The look-up tables are also capable of modifying the image gray levels. The look-up tables are loaded with a transform function that converts gray levels between two values to a third value. For example, all gray levels from 1 to 20 in the image can be stored as gray level 0.

Figure 5:
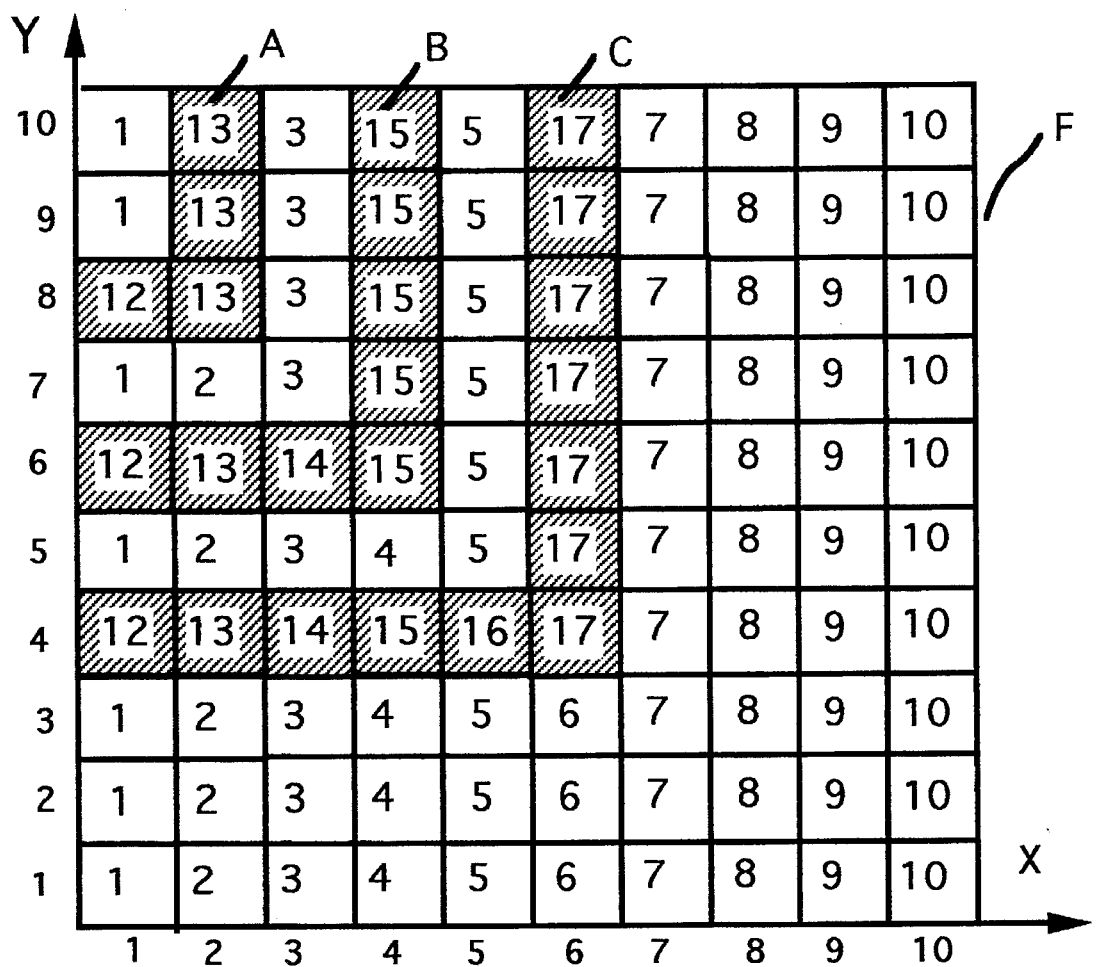
FIG. 5 is a diagram showing an image obtained as a result of superposition of the two images of FIG. 2 and FIG. 4

FIG. 5—Superposition Of Product And Templates Images

To determine the dimensions of PC board wires A, B, and C (FIG. 4), its image is superposed onto the template images shown in FIG. 2. The superposition is the summation of gray levels for equally addressed pixels of the two images. The result is a third image, the superposed image. Wires A, B, and C are highlighted with gray shade in the superposed image. Each template image of FIG. 2 is superposed with the image of FIG. 4. E.g., two images are superposed, the modified product image (FIG. 4) and template image B1 (FIG. 2). The result is a superposed image at Y=4 and X=1 to 10 in FIG. 5 with highlighted gray at locations X=1 to 6. Repeating this ten times will result in the full superposed image F shown in FIG. 5.

Gray levels related to wires A, B, and C in the superposed image will have no common values with gray levels outside the wire boundaries. This means that there is no confusion between gray level values on the product's wires and its background. This fact used in the subsequent histogram analysis.

For example, superposing line 4 of the template image of FIG. 2 with line 4 of the image of FIG. 4 will result in the following values: (1,4,12), (2,4,13), (3,4,14), (4,4,15), (5,4, 16), (6,4,17), (7,4,7), (8,4,8), (9,4,9), (10,4,10). In the first value (1,4, 12), X= 1, Y= 4, and gray level 12 (obtained by 11+1=12), and so on for the rest of the line.

Superposing line 10 of the template image of FIG. 2 with line 10 of the image of FIG. 4 will result in the following values: (1,10,1), (2,10,13), (3,10,3), (4,10,15), (5,10,5), (6,10,17), (7,10,7), (8,10,8), (9,10,9), (10,10,10).

The product image is temporary and is stored in the computer memory on a realtime basis. The template image is created beforehand and permanently stored in the computer for as long as the inspection process is carded out.

Figure 6:
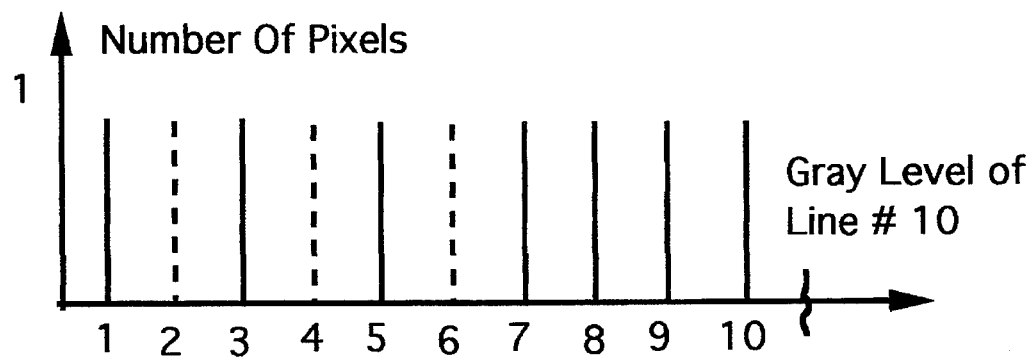
FIG. 6 is a truncated histogram of the template image in FIG. 5.

FIG. 6—Histogram Of Image Of FIG. 5

The result of the superposition process (FIG. 5) is used as a basis for building the histogram shown in FIG. 6. The histogram vector has only one line. This is not a histogram of a full superposed image. n our example, the histogram is performed on line Y=10.

The system will perform histograms in a unique way, not on a full superposed image, but a histogram on a portion of the superposed image which relates to the size of the template image.

In our example, the system will perform a histogram on one line (line histogram) or the full superposed image. This histogram vector is stored in a compressed format. The system will repeat the histogram process ten times, creating one histogram vector for each line.

The diagram of FIG. 6 is a plot of a histogram vector of line 10 of the superposed image. (FIG. 5). In our current example the system will repeat ten times, creating ten histogram vectors for the lines of the superposed image.

Therefore, the line histogram vector (not shown) for line Y=10 will be the following: (1,1), (2,0), (3,1), (4,0), (5,1), (6,0), (7,1), (8,1), (9,1), (10,1) and so on.

If we look at the line-histogram vector carefully, we see that the information needed is within the first part of the line-histogram vector, i.e., within the first ten places of the line-histogram. We see that whenever the histogram value is equal to zero, it means the presence of a PC wire. The value (2,0) indicates the presence of wire A at location X=2, Y=10 (FIG. 4). The value (4,0) indicates the presence of wire B (FIG. 4) at location X=4, Y=10. The value (6,0) indicates the presence of wire C (FIG. 4) at location X=6, Y=10. It also indicates that the thickness dimension of wire A, B, and C on line Y= 10 is one pixel.

The line-histogram vector of the superposed image is loaded with a data value of 1 or of 0 as long as the histogram length is equal to or smaller then the highest gray level value of the template image.

The truncated histogram vector with length equal or higher than to the Highest Gray Level Value (HGLV) of the template image is saved in memory in a compressed format.

Time and memory locations are saved by using this truncated histogram vector. The truncated line-histogram of the current example is expressed as an assembly of ten bits. Each bit can have the value of 1 or 0. Since we have ten short histograms (one for each line) we will need 10×10= 100 bits to express the histogram vector of the full image.

Using the prior art method of our copending application (supra), the full template image will have to have 100 different gray level values, one for each pixel of the template of FIG. 2. The histogram will be of the full superposed image histogram. It will be 100 places long (for 100 gray levels). To write the gray level values from 1 to 100 we need 7 bits per number. The total number of bits to be stored and analyzed is 7×100=700 bits. Compared with the truncated histogram vector, this provides a savings factor of 7. The bigger the image size, the bigger is the savings factor.

The ability to calculate the dimensions of PC wires based on the analysis of histogram (line-histogram) vectors is done very quickly as the vectors are very short. The length of the histogram vectors is equal to the highest gray level in the template image (FIG. 2). Most of the time the line-template image size is of the order of 512 pixels. In case of conventional pixel-by-pixel analysis of the full image, the total number of pixels in the image must analyzed. This would be equivalent to a vector of about 512×512 bits. Using VME buss (a standard computer data buss) of 32 bit size to transfer the dam of the truncated vector to the CPU will take 8.2 msec. Analyzing the truncated vector data will take additional 4 msec (to come up with wires dimensions) when using an ITI image processing system. The total processing time will be 12.2 msec, which is a factor of 10 faster than any method known today.

The truncated histogram vector can be created and save in memory in a compressed form. Each gray level in the truncated histogram vector is represented by the value 1 or 0. This data can be written with bits instead of bytes. One byte will include the data of eight locations in the histogram vector.

Current technology uses eight bytes or more to store the same in memory information.

Template images of the size of a line in a standard image are easy to control, and obtaining truncated histogram vectors will be explained by the example of FIG. 7

Figure 7:
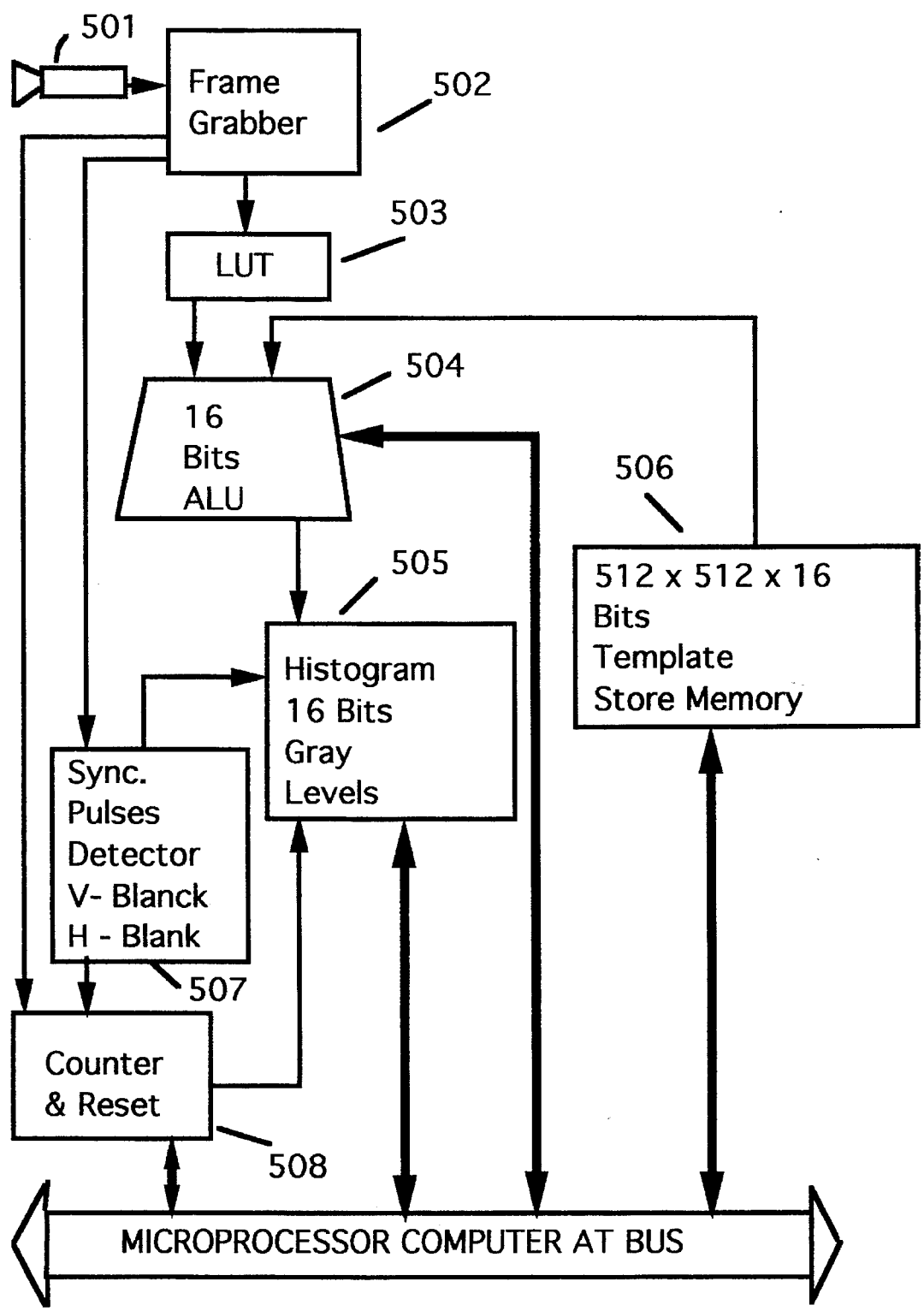
FIG. 7 a block diagram of inspection system for the invention Drawing Reference Numerals

FIG. 7—Inspection System

The prior-art system of FIG. 1 performs a full size image histogram. The system on FIG. 7 performs a histogram on line-by-line basis, written in a compressed format and with a truncated length, as explained below.

The diagram of FIG. 7 illustrates an inspection system using the method of the invention. The hardware uses off-the-shelf parts. The inspection system is connected to a microprocessor computer (e.g., an IBM PC 486 PC, not shown) through an AT bus as shown.

The personal computer uses the AT bus to program the template images' gray level values of the template image and store them in memory location 506. All of all the line template images together define the template image stored in memory location 506. Counter & Reset circuit 508 is programmed with the truncation value of a regular histogram vector. The highest gray level value (HGLV) of the template image is the line-template image.

Camera 501 is an RS1 70, CAM3000 by Loral Fairchild Imaging Sensors. Frame grabber 502 is for acquisition, storage and display of images. During acquisition, the grabber converts an image from analog to digital to form an array of data points. The Look Up Tables, (LUT 503) convert the image gray level values to preselected values. A sixteen bit ALU, (Arithmetic Logic Unit) 504 superposes the modified image (output of LUT 503) and the template image (the output of memory 506).

Unit 505 truncates the histogram of the superposed image. Synchronization pulse detector 507 detects vertical blanks and horizontal image blanks. Timing pulses generated by camera 501 (not shown) are supplied to the rest of the units. Frame grabber 502 can also be used as the synchronization source that feeds the rest of the units, including the camera. This is asynchronous image acquisition.

Unit 502 can be a DT2851, and Units 503 to 507 can be a DT2868, both manufactured by Data Translation. Counter & Reset 508 is an additional circuit, part number 74290, Texas Instrument Company.

The histogram unit (505) starts working on horizontal and vertical synchronization pulses. On sensing the vertical and horizontal blank pulses, counter 508 begins counting the number of pixels transferred from unit 504 to unit 505. The counter value advances by one value each time a pixel's clock appears.

Counter 508 will let unit 505 work and calculate the histogram vector. On a counter value of HGLV, unit 508 resets unit 505 and itself. The histogram vector's length is then equal to HGLV.

Resetting the histogram unit starts a new cycle of calculating and outputting the truncated histogram vector to the personal computer. The cycle repeats on each vertical and horizontal blank. Truncated histogram vectors are transferred by the AT buss to the personal computer.

The truncated vector data will be transferred in a compressed form where each bit of value 1 or 0 (not a byte) will indicate the presence of a gray level. The personal computer will analyze the truncated histogram vectors for the presence of ones and zeroes for detecting the present of PC board wires, other components, and defects.

SUMMARY RAMIFICATIONS, AND SCOPE

Accordingly, the reader will see that we have provided a technique that will enable the detection of defects of size equivalent to one pixel or more, on static or moving products by analyzing their images. This technique enables manufacturers to measure with great accuracy a product's dimensions and therefore fluctuations in such dimensions. Defects are detected on a part of or on the full surface of the product. Surface defects are also detected, sized, and mapped. The technique is much faster than methods used in the prior art. Template images are a primary part of the technique and their gray levels and shapes are carefully selected and stored in the memory of the computer for use in real time. Careful modifying and quantizing of the image's gray levels is essential to provide satisfactory results upon superposition of the image with the template images. Analysis of the truncated histograms built on the results of superposition enables the detection of deviations in the product's dimensions and surface defects.

While the above description contains many specific details, these should not construed as limitations on the scope of the invention, but as exemplifications of the presently preferred embodiments thereof. Many other ramifications and variations are possible within the teachings to the invention.

For example, defects on printed matter, defective patterns on microfilm, and so on can be detected. Also the volume of a product can be measured using its dimensions.

Therefore, the scope of the invention should be determined, not only by examples given, but by the appended claims and their legal equivalents.

We claim:

1. A method for inspecting products that move on a production line for defects, marks, and dimensional accuracy with the use of a sensor and a processing unit having a memory, comprising:

(a) providing and saving in said memory a plurality of computer-generated artificial template images, each of said plurality of computer-generated artificial template images having a plurality of predetermined coordinates and addresses mapped within said memory, said plurality of computer-generated artificial template images together defining a full template image, (b) assigning a plurality of predetermined gray levels to each of said plurality of computer-generated artificial template images, (c) creating a respective plurality of histogram vectors of said plurality of computer-generated artificial template images, each of said histogram vectors having values which are correlated to said coordinates and addresses mapped within said memory, (d) creating a product image by sensing one of said products with said sensor, said product image comprising a multiplicity of pixels with intensity levels expressed as a plurality of respective gray levels, (e) modifying said product image to produce a modified product image by converting said plurality of gray levels of said product image to a plurality of modified gray levels, (f) creating a plurality of additional gray levels by mathematically combining said plurality of modified gray levels with said plurality of predetermined gray levels so that said plurality of additional gray levels are different from said plurality of modified gray levels or said plurality of predetermined gray levels, and (g) analyzing said plurality of computer-generated artificial template images, said modified product image, and said plurality of additional gray levels for product inspection.

2. The method of claim 1, further including creating said additional gray levels by superposing said modified product image onto said template images by summing gray levels assigned to memory locations of said product image and said full template image, so as to produce a summation which represents a superposed image, and saving said summation in said memory.

3. The method of claim 2, further including creating a histogram vector of said superposed image.

4. The method of claim 3 wherein said creating said histogram vector of said superposed image is done so that said histogram vector is compressed.

5. The method of claim 3 wherein said creating of histogram vector of said superposed image is done by including gray levels that are smaller than the highest gray levels of said computer-generated artificial template images so that said histogram vector is truncated.

6. The method of claim 3, further including comparing values of said histogram vectors of said superposed image with those of said histogram vectors of said computer-generated artificial template image.

7. The method of claim 3, further including analyzing said histogram vectors of said superposed image by its discontinuities to indicate dimensions in numbers of pixels.

8. The method of claim 3, further including analyzing any new gray level values which appear in said histogram vectors of said superposed image and were absent in said histogram of said computer-generated artificial template image.

9. The method of claim 3, further including analyzing said histogram vectors of said superposed image by its discontinuities to detect, size, and map said defects in numbers of pixels.

10. The method of claim 3, further including counting the number of pixels equal to gray levels in said histogram vector and saving the count in memory.

11. The method of claim 3, further including analyzing said histogram vectors of said superposed image by its discontinuities to detect marks and express their size in numbers of pixels.

12. The method of claim 1 wherein said modifying said product image to produce a modified product image is performed by converting said gray levels of said product image to modified gray levels which are higher than said gray levels of said full template image minus the lowest gray level of said computer-generated artificial template images.

13. The method of claim 1, further including creating a superposed image by superposing said modified product image onto said template image by summing gray levels assigned to memory locations of said product image and said computer-generated artificial template images, and saving the results of the summation in said memory.

14. The method of claim 1 further including creating a truncated histogram vector of said superposed image by including gray levels that are smaller than the highest gray levels of said computer-generated artificial template image.

15. The method of claim 1, further including creating a compressed histogram vector of said superposed image.

16. The method of claim 1 wherein said products are printed circuit boards.

17. The method of claim 1, further including modifying the number of said template images to one.

18. The method of claim 1 wherein said providing and saving in memory is done so that said full template image has a size equal to a line created by a plurality of said pixels.

* * * * *

UNITED STATES PATENT AND TRADEMARK OFFICE
CERTIFICATE OF CORRECTION

PATENT NO.: 5,481,619
DATED: Jan. 2, 1996
PATENTEES: N. Schwartz et al.

It is certified that error appears in the above-identified patent and that said Letters Patent is hereby corrected as shown below:

Col. 3, line 59, change "pan" to —part—.
Col. 5, line 51, change "fine" to —line—.
Col. 6, line 7, change "fine" to —line—.
Col. 6, line 17, change "fines" to —lines—.
Col. 6, line 25, change "storm" to —stored—.
Col. 9, line 15, change "dam" to —data—.

Signed and Sealed this

Twenty-third Day of July, 1996

*Attest:*

BRUCE LEHMAN

*Attesting Officer*  *Commissioner of Patents and Trademarks*